US011183699B2

(12) United States Patent
Tanimoto et al.

(10) Patent No.: US 11,183,699 B2
(45) Date of Patent: Nov. 23, 2021

(54) FUEL CELL SYSTEM AND METHOD OF CONTROLLING FUEL CELL SYSTEM

(71) Applicant: HONDA MOTOR CO., LTD., Tokyo (JP)

(72) Inventors: Satoshi Tanimoto, Wako (JP); Go Kikuchi, Wako (JP); Joji Nakashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 159 days.

(21) Appl. No.: 16/656,612

(22) Filed: Oct. 18, 2019

(65) Prior Publication Data

US 2020/0127311 A1  Apr. 23, 2020

(30) Foreign Application Priority Data

Oct. 22, 2018 (JP) .............................. JP2018-198388

(51) Int. Cl.
| | |
|---|---|
| *H01M 8/04302* | (2016.01) |
| *H01M 8/0432* | (2016.01) |
| *H01M 8/04225* | (2016.01) |
| *H01M 8/04858* | (2016.01) |
| *H01M 8/04223* | (2016.01) |
| *H01M 8/04992* | (2016.01) |

(52) U.S. Cl.
CPC ..... *H01M 8/04302* (2016.02); *H01M 8/0432* (2013.01); *H01M 8/0491* (2013.01); *H01M 8/04225* (2016.02); *H01M 8/04253* (2013.01); *H01M 8/04992* (2013.01)

(58) Field of Classification Search
CPC ......... H01M 8/04225; H01M 8/04253; H01M 8/04302; H01M 8/0432; H01M 8/0491; H01M 8/04992; Y02E 60/50
See application file for complete search history.

(56) References Cited

U.S. PATENT DOCUMENTS

| | | | |
|---|---|---|---|
| 7,572,529 B2 | 8/2009 | Kato et al. | |
| 2005/0053810 A1* | 3/2005 | Kato ................. | H01M 8/04268 429/429 |

FOREIGN PATENT DOCUMENTS

| | | |
|---|---|---|
| JP | 07-272736 | 10/1995 |
| JP | 2005-085578 | 3/2005 |

OTHER PUBLICATIONS

Japanese Office Action for Japanese Patent Application No. 2018-198388 dated Jul. 21, 2020.

* cited by examiner

*Primary Examiner* — Brittany L Raymond
(74) *Attorney, Agent, or Firm* — Amin, Turocy & Watson, LLP (57) ABSTRACT

A temperature sensor of a fuel cell system detects, as a start-up time temperature, the temperature of a fuel cell stack or the outside temperature at the time of starting operation. A memory stores a plurality of current limitation patterns. A current limiting unit selects a current limitation pattern based on the detected start-up time temperature, and limits electrical current collected from the fuel cell stack based on the selected current limitation pattern and the temperature during operation of the fuel cell stack detected by the temperature sensor. A threshold value for a period until the temperature of the fuel cell stack reaches a reference temperature is set to be smaller as the start-up time temperature at which the current limitation pattern is selected from the plurality of current limitation patterns becomes lower.

12 Claims, 3 Drawing Sheets

FIG. 1

FUEL CELL SYSTEM AND METHOD OF CONTROLLING FUEL CELL SYSTEM

CROSS-REFERENCE TO RELATED APPLICATION

This application is based upon and claims the benefit of priority from Japanese Patent Application No. 2018-198388 filed on Oct. 22, 2018, the contents of which are incorporated herein by reference.

BACKGROUND OF THE INVENTION

Field of the Invention

The present invention relates to a fuel cell system including a fuel cell stack formed by stacking a plurality of power generation cells, and a method of controlling the fuel cell system.

Description of the Related Art

For example, a solid polymer electrolyte fuel cell includes a membrane electrode assembly. The membrane electrode assembly includes an electrolyte membrane, and electrodes on both surfaces of the electrolyte membrane. The electrolyte membrane is a polymer ion exchange membrane. The membrane electrode assembly is sandwiched between separators to form a power generation cell. A number of power generation cells required for obtaining the desired electrical energy are stacked together to form a stack body. Further, power collecting terminal plates for collecting electrical current generated in power generation in each of the power generation cells, and end plates for holding the stacked power generation cells are stacked together at both ends of the stack body in a stacking direction.

In the fuel cell stack of this type, in consideration of maintenance of suitable power generation and suppression of deterioration of the electrolyte membrane, etc., it is required to avoid decrease of the power generation voltage below the predetermined voltage (hereinafter referred to as the "lower limit voltage"). For example, in Japanese Laid-Open Patent Publication No. 07-272736, a system of limiting the electrical current collected from the fuel cell stack, and avoiding decrease of the power generation voltage below the lower limit voltage is proposed.

SUMMARY OF THE INVENTION

The lower limit voltage is changed by the temperature of the fuel cell stack (hereinafter also referred to as the "stack temperature"). In particular, in the low temperature range below freezing, etc., as the decrease in the stack temperature, the lower limit voltage tends to be decreased. Therefore, it may be considered to set a threshold value of the maximum electrical current (hereinafter also referred to as the "threshold") which can be collected from the fuel cell stack. Further, at the time of starting operation of the fuel cell stack under the low temperature environment, as the stack temperature, for example, a reactant gas discharged from the stack and the outlet temperature of a coolant are monitored, and the electrical current collected from the fuel cell stack is limited based on the threshold value corresponding to the detected stack temperature. In this manner, it is possible to prevent the power generation voltage from being decreased below the lower limit voltage.

In this regard, as the outside temperature becomes lower, the amount of heat radiated from the end power generation cells provided adjacent to the end of the stack body in the stacking direction to the outside temperature through the terminal plate, etc. becomes large. Therefore, the end power generation cells tend to have low temperature in comparison with the power generation cell on the central side in the stacking direction. Thus, in the case of starting operation of the fuel cell stack under the low temperature environment, there is a concern that it may not be possible to avoid decrease of the power generation voltage of the end power generation cells below the lower limit voltage only by controlling electrical current collected from the fuel cell stack based on the threshold corresponding to the detected stack temperature. In this case, there is a concern that it becomes difficult to suitably maintain the power generation stability of the fuel cell stack, and durability of the fuel cell stack is decreased in the event that it is not possible to suppress deterioration of the end power generation cells sufficiently.

A main object of the present invention is to provide a fuel cell system in which it is possible to suitably maintain power generation stability even operation is started under the low temperature environment, and suppress decrease in the durability of the fuel cell stack.

Another object of the present invention is to provide a method of controlling the fuel cell system.

According an aspect of the present invention, a fuel cell system including a fuel cell stack formed by stacking a plurality of power generation cells is provided. The fuel cell system includes a start-up time temperature detection unit configured to detect, as a start-up time temperature, a temperature of the fuel cell stack or an outside temperature at a time of starting operation, a stack temperature detection unit configured to detect the temperature of the fuel cell stack, and a current limiting unit configured to limit electric current collected from the fuel cell stack. The current limiting unit selects, based on the start-up time temperature, one of a plurality of current limitation patterns each defining, for each of the start-up time temperatures, a relationship between a temperature during operation of the fuel cell stack and a threshold value of maximum electrical current collected from the fuel cell stack, and limits the electrical current collected from the fuel cell stack according to the selected current limitation pattern. The threshold value for a period in which the temperature of the fuel cell stack increases from the start-up time temperature until the temperature of the fuel cell stack reaches a predetermined reference temperature is set to be smaller as the start-up time temperature at which the current limitation pattern is selected from the plurality of current limitation patterns becomes lower.

According to another aspect of the present invention, a method of controlling a fuel cell system including a fuel cell stack formed by stacking a plurality of power generation cells is provided. The method includes a start-up time temperature detection step of detecting, as a start-up time temperature, a temperature of the fuel cell stack or an outside temperature at a time of starting operation, a selection step of selecting a current limitation pattern corresponding to the start-up time temperature detected in the start-up time temperature detection step, from a plurality of current limitation patterns each defining, for each of the start-up time temperatures, a relationship between a temperature during operation of the fuel cell stack and a threshold value of maximum electrical current collected from the fuel cell stack, and a power generation step of performing power generation while limiting electrical current collected from the fuel cell stack based on the selected current limitation pattern and the temperature during operation of the fuel cell stack detected by a stack temperature detection unit. The selection step includes selecting the current limitation pattern in which the threshold value for a period in which the temperature of the fuel cell stack increases from the start-up time temperature until the temperature of the fuel cell stack reaches a predetermined reference temperature is set to be smaller as the start-up time temperature detected in the start-up time temperature detection step becomes lower.

In the present invention, the current limitation pattern, in which the threshold value for a period in which the temperature of the fuel cell stack increases from the start-up time temperature until the temperature of the fuel cell stack reaches a predetermined reference temperature becomes smaller as the start-up time temperature becomes lower, i.e., as the amount of heat radiated from the end power generation cell provided at the end of the fuel cell stack in the stacking direction increases, is selected.

By limiting the electrical current collected from the fuel cell stack based on the current limitation pattern selected in this manner, at the time of inducing power generation reaction to increase the temperature of the fuel cell stack from the start-up time temperature to the reference temperature, it is possible to suppress decrease in the power generation voltage below the lower limit voltage also in the end power generation cell where the temperature tends to be low in comparison with the other power generation cells.

Therefore, in the present invention, even if operation of the fuel cell stack is started under the low temperature environment, it is possible to suitably maintain the power generation stability, and suppress decrease in the durability of the fuel cell stack.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A preferred embodiment of a fuel cell system and a method of controlling the fuel cell system according to the present invention will be described in detail with reference to the accompanying drawings. In the following drawings, the constituent elements that offer the same or equivalent functions and advantages are labeled with the same reference numerals, and such constituent elements may not be described repeatedly.

Figure 1:
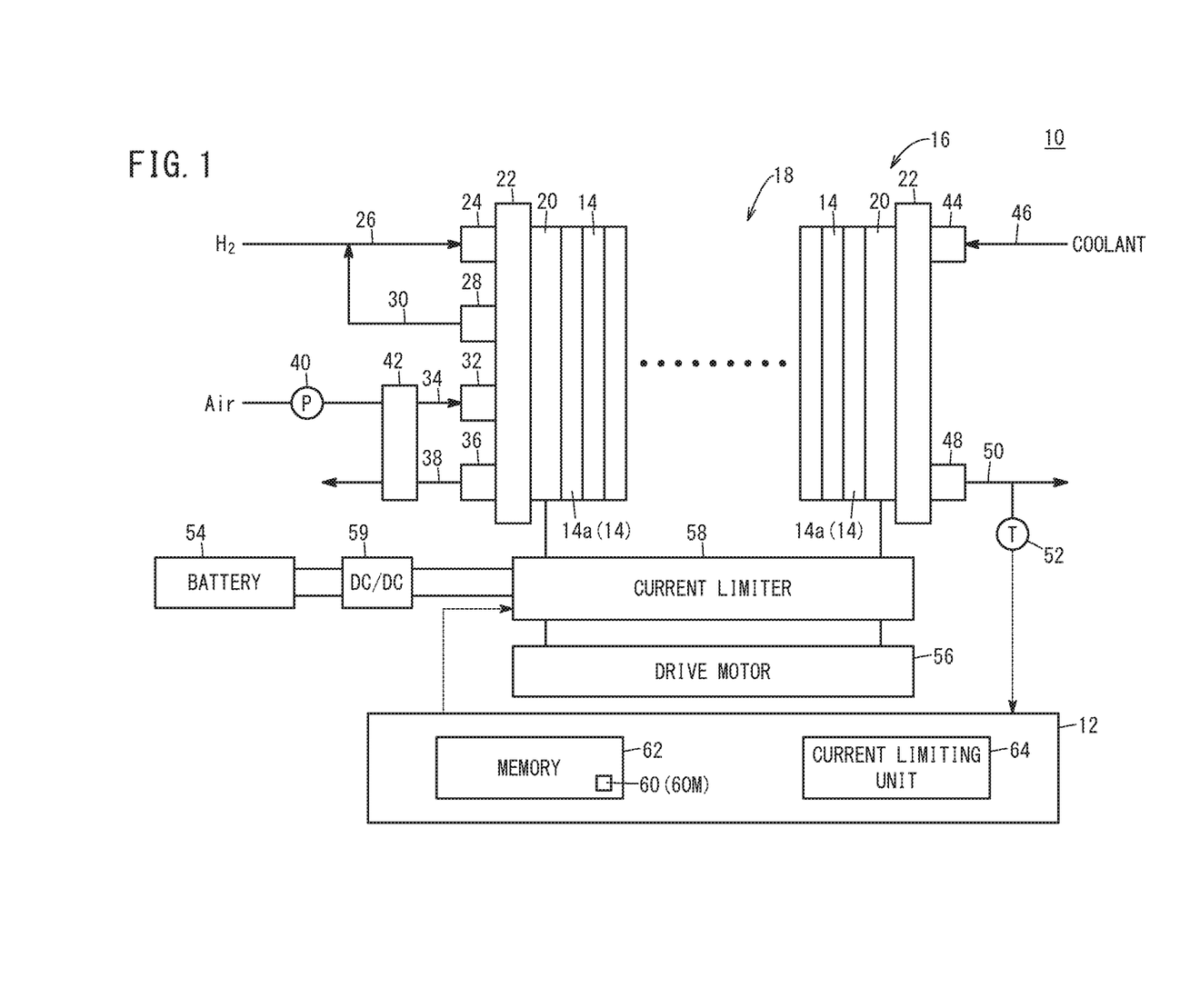
FIG. 1 is a block diagram showing structure of a fuel cell system according to an embodiment of the present invention.

In the embodiment of the present invention, though a case where a fuel cell system 10 as shown in FIG. 1 is mounted in a fuel cell vehicle such as a fuel cell electric automobile (not shown) is taken as an example, the present invention is not limited in this respect. The fuel cell system 10 includes a control unit 12 for controlling the fuel cell system 10, and a fuel cell stack 16 formed by stacking a plurality of power generation cells 14.

Structure of the power generation cells 14 is known. Therefore, the power generation cells 14 are not illustrated or described in detail. For example, each of the power generation cells 14 includes a membrane electrode assembly and a pair of separators sandwiching the membrane electrode assembly. The membrane electrode assembly includes an electrolyte membrane formed of a polymer ion exchange membrane, and an anode and a cathode provided on both sides of the electrolyte membrane. Then, the fuel gas containing hydrogen ($H_2$) is supplied to the anode, and the oxygen-containing gas such as the air is supplied to the cathode to perform power generation.

A number of power generation cells 14 required for obtaining the desired electrical energy are stacked together to form a stack body 18. The stack body 18 is sandwiched, from both sides in the stacking direction, between terminal plates 20 for collecting power generation electrical current from each of the power generation cells 14. Further, the terminal plates 20 are sandwiched between end plates 22. As a result, the plurality of power generation cells 14 or the like are held in a stacked state to form the fuel cell stack 16. As the outside temperature becomes lower, the amount of heat radiated from end power generation cells 14a provided at ends of the stack body 18 in the stacking direction to the outside air through the terminal plate 20, etc. becomes large. Therefore, the end power generation cells 14a tend to have low temperature in comparison with the power generation cells 14 at the center of the stack body 18 in the stacking direction.

In the fuel cell stack 16, a fuel gas supply channel 26 is connected to a fuel gas supply port 24 of the anode, and a fuel exhaust gas channel 30 for circulating the fuel gas into the fuel gas supply channel 26 is connected to a fuel exhaust gas discharge port 28 of the anode. Further, an oxygen-containing gas supply channel 34 is connected to an oxygen-containing gas supply port 32 of the cathode, and an oxygen-containing exhaust gas channel 38 is connected to the oxygen-containing exhaust gas discharge port 36 of the cathode.

Hydrogen stored in a hydrogen tank (not shown) is supplied as a fuel gas to the fuel gas supply channel 26. The downstream side of the fuel exhaust gas channel 30 is connected to the fuel gas supply channel 26 through a gas liquid separator (not shown). In the structure, after liquid such as water is separated from the fuel exhaust gas containing some fuel gas which has not been consumed at the anode, at a gas liquid separator, the fuel exhaust gas is mixed with hydrogen in the fuel gas supply channel 26, and supplied to the fuel gas supply port 24 of the fuel cell stack 16 again.

An air pump 40 and a humidifier 42 are provided in the oxygen-containing gas supply channel 34 in this order from the upstream side. By driving the air pump 40, the air from the atmospheric air is sucked as an oxygen-containing gas into the oxygen-containing gas supply channel 34. After the air is compressed by the air pump 40, the air is supplied to the humidifier 42. In the humidifier 42, water is exchanged between the oxygen-containing gas in the oxygen-containing gas supply channel 34 and the oxygen-containing exhaust gas in the oxygen-containing exhaust gas channel 38 to humidify the oxygen-containing gas supplied to the cathode.

In the fuel cell stack 16, a coolant supply channel 46 is connected a coolant supply port 44, and a coolant discharge channel 50 is connected to a coolant discharge port 48. The coolant supply port 44 and the coolant discharge port 48 are connected to a coolant flow field (not shown) provided in the fuel cell stack 16. In the embodiment of the present invention, a temperature sensor 52 is provided in the coolant discharge channel 50, as a stack temperature detection unit and a start-up time temperature detection unit. The temperature sensor 52 can detect the temperature of the coolant discharge channel 50, as the temperature of the fuel cell stack 16, and detect the temperature at the time of starting operation of the fuel cell stack 16 as start-up time temperature. Further, the temperature sensor 52 outputs, to the control unit 12, the temperature of the fuel cell stack 16 and the start-up time temperature as detection results.

As long as the temperature sensor 52 can detect the temperature of the fuel cell stack 16, the temperature sensor 52 may be configured to be capable of detecting, as the temperature of the fuel cell stack 16, the temperature of the fuel exhaust gas channel 30, the temperature of the oxygen-containing exhaust gas channel 38, and the temperature of the fuel cell stack 16 itself, for example, instead of the temperature of the coolant discharge channel 50. Further, as long as the temperature sensor 52 is provided at any location in the fuel cell system 10, the temperature sensor 52 may detect the temperature of the location as the temperature of the fuel cell stack 16.

Further, in the embodiment of the present invention, the temperature sensor 52 functions as both the stack temperature detection unit and the start-up time temperature detection unit. However, the present invention is not limited in this respect. The start-up time temperature detection unit may be a temperature sensor (not shown) that is provided in addition to the temperature sensor 52, and is capable of detecting the temperature at the time of starting operation of the fuel cell stack 16 or the outside temperature at the time of starting operation of the fuel cell stack 16 as the start-up time temperature.

The terminal plate 20 of the fuel cell stack 16 can be electrically connected to a battery 54 capable of storing electrical energy, and a drive motor 56 for applying a driving force to the fuel cell vehicle through a current limiter 58. The battery 54 is electrically connectable to the current limiter 58 through a DC/DC converter 59. If the voltage of the battery 54 is lower than the output voltage of the fuel cell stack 16, the electrical energy generated in the fuel cell stack 16 is stored in the battery 54. On the other hand, the battery 54 supplies electrical energy to the drive motor 56 as necessary, to assist driving of the drive motor 56. For example, in the case where operation of the fuel cell stack 16 is started under the low temperature environment below freezing, etc., during warm up operation of heating the fuel cell stack 16 by power generation reaction until the temperature of the fuel cell stack 16 reaches the suitable operating temperature, electrical energy is supplied to the drive motor 56 by the battery 54 for enabling the vehicle to travel.

The battery 54, the drive motor 56, and the current limiter 58 are controlled by the control unit 12. Further, the power generation voltage and the output current of the fuel cell stack 16, and the power generation voltage of each of the power generation cells 14 are detected by a current sensor and a voltage sensor (not shown), and supplied into the control unit 12.

The control unit 12 is a microcomputer having a CPU, etc. (not shown), and the CPU executes predetermined computation according to a control program to perform normal operation control of the fuel cell system 10, and various processing or controls such as warm up operation control. Specifically, the control unit 12 includes a memory 62 for storing a plurality of current limitation patterns 60 (see FIG. 2), and a current limiting unit 64 for limiting electrical current collected from the fuel cell stack 16. It should be noted that the control unit 12 may not have the memory 62, and may obtain a plurality of current limitation patterns 60 from the outside of the fuel cell system 10 (fuel cell vehicle).

The memory 62 stores the plurality of current limitation patterns 60 each defining, for each of the start-up time temperatures, the relationship between the temperature during operation of the fuel cell stack 16 and a threshold value of the maximum current collected from the fuel cell stack 16. In the embodiment of the present invention, the memory 62 stores the current limitation patterns 60 in the form of current limitation threshold value maps 60M. Alternatively, for example, the memory 62 may store the current limitation patterns 60 in the form of a function.

The current limiting unit 64 selects one current limitation pattern 60 from the plurality of current limitation patterns 60 stored in the memory 62, and limits electrical current collected from the fuel cell stack 16 in accordance with the selected current limitation pattern 60. Specifically, the current limiting unit 64 controls, through the current limiter 58, the electrical current collected from the fuel cell stack 16 based on the selected current limitation pattern 60, and the temperature during operation of the fuel cell stack 16 detected (monitored) by the temperature sensor 52 (stack temperature detection unit).

Figure 2:
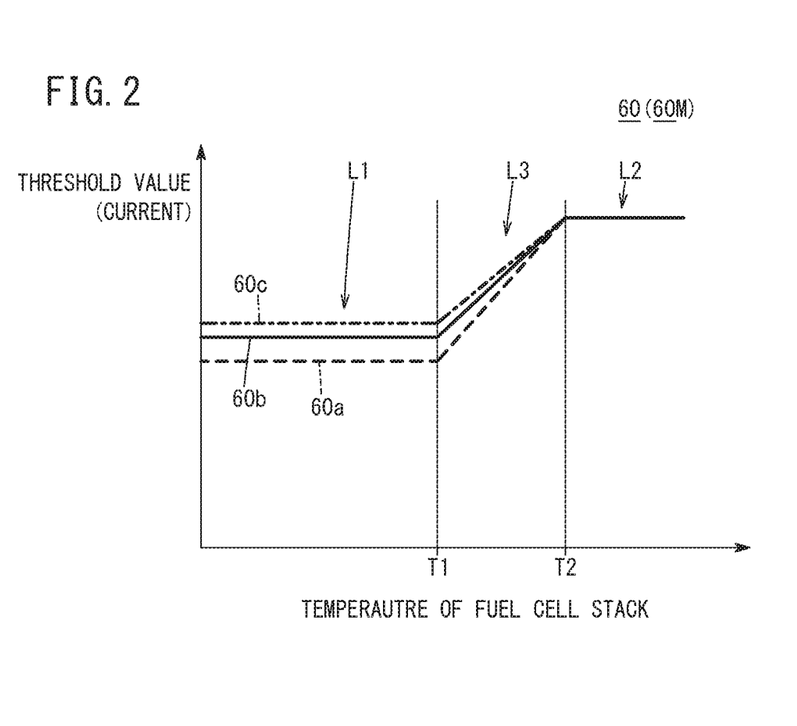
FIG. 2 is a graph showing an example of a plurality of current restriction patterns stored in a memory of the fuel cell system in FIG. 1.

The current limitation pattern 60 defines a threshold value of the maximum current which can be collected from the fuel cell stack 16 (hereinafter also simply referred to as the threshold value), based on the temperature during operation of the fuel cell stack 16. The electrical current is collected from the fuel cell stack 16 in a manner that the electrical current does not to exceed the threshold value corresponding to the temperature of the fuel cell stack 16. In this manner, it is possible to avoid decrease of the power generation voltage below the lower limit voltage. The lower limit voltage is the minimum value of the power generation voltage where it is possible to avoid situations in which power generation stability is compromised and the electrolyte membrane is deteriorated, the lower limit voltage being defined correspondingly to the fuel cell stack 16.

Examples of the plurality of current limitation patterns 60 include a first current limitation pattern 60a selected when the start-up time temperature is −30° C. as shown by a broken line in FIG. 2, a second current limitation pattern 60b selected when the start-up time temperature is −20° C. as shown by a solid line in FIG. 2, and a third current limitation pattern 60c selected when the start-up time temperature is −10° C. as shown by a one dot chain line in FIG. 2.

In the first current limitation pattern 60a, the second current limitation pattern 60b, and the third current limitation pattern 60c, the threshold values are determined in accordance with the amount of heat radiated from the end power generation cells 14a when the start-up time temperature is −30° C., −20° C., and −10° C., respectively. That is, in the current limitation pattern 60, different threshold values are defined in accordance with the amount of heat radiated from the end power generation cells 14a at the start-up time temperature. Hereinafter, in the case where there is no need to make any distinction between the first current limitation pattern 60a, the second current limitation pattern 60b, and the third current limitation pattern 60c, these patterns 60a, 60b, 60c are also simply referred to as the "current limitation pattern(s) 60", collectively.

The plurality of current limitation patterns 60 are not limited to the above three patterns. At least two current limitation patterns 60 corresponding to a predetermined start-up time temperature should be provided. As the number of the current limitation patterns 60 increases, it becomes possible to more accurately determine the threshold value in accordance with the amount of heat radiated from the end power generation cells 14a at the start-up time temperature.

In each of the current limitation patterns 60, until the temperature of the fuel cell stack 16 reaches a non-freezing temperature T1 at which the end power generation cells 14a are considered to be not frozen, the threshold value is set to a constant first threshold value L1. Further, after the temperature of the fuel cell stack 16 reaches a reference temperature T2 which is higher than the non-freezing temperature T1 and is suitable for normal operation of the fuel cell stack 16, the threshold value is set to a second threshold value L2 which is higher than the first threshold value L1. Further, during the period in which the temperature of the fuel cell stack 16 changes from the non-freezing temperature T1 until the temperature of the fuel cell stack 16 reaches the reference temperature T2, the threshold value is set to a variable threshold value L3 which increases at a predetermined rate from the first threshold value L1 to the second threshold value L2.

The threshold values (the first threshold value L1 and the variable threshold value L3) for the period in which the temperature of the fuel cell stack 16 increases from the start-up time temperature until the temperature of the fuel cell stack 16 reaches the predetermined reference temperature T2 are set to be smaller as the start-up time temperature at which the current limitation pattern 60 is selected from these plurality of current limitation patterns 60 becomes lower. Further, the non-freezing temperature T1 and the reference temperature T2 are common to the plurality of current limitation patterns 60.

Further, the increase rate of the variable threshold value L3 becomes larger as the start-up time temperature at which the current limitation pattern 60 is selected from the plurality of current limitation patterns 60 becomes lower. Since the lower limit voltage tends to become lower under the lower temperature environment, the first threshold value L1 becomes smaller as the start-up time temperature at which the current limitation pattern 60 is selected becomes lower. On the other hand, when the temperature of the fuel cell stack 16 increases toward the reference temperature T2, the difference among the threshold values of the plurality of current limitation patterns 60 becomes small. Therefore, the increase rate of the variable threshold value L3 becomes larger as the start-up time temperature at which the current limitation pattern 60 is selected becomes lower.

In the case where the temperature of the fuel cell stack 16 is not less than the reference temperature T2, the fuel cell stack 16 is close to the optimum operating temperature range. Therefore, in comparison with the case where the fuel cell stack 16 is in a low temperature range, e.g., below freezing, the amount of heat radiated from the end power generation cells 14a becomes small, and the lower limit voltage becomes high. Thus, even if the output current becomes large, it becomes less likely that the power generation stability is compromised and the electrolyte membrane is deteriorated. Therefore, in the embodiment of the present invention, in the case where the temperature of the fuel cell stack 16 is not less than the reference temperature T2, regardless of the start-up time temperature, the second threshold values L2 of the plurality of current limitation patterns 60 are set to be equal to the threshold value at the time of normal operation in the optimum operating temperature range of the fuel cell stack 16.

It should be noted that also the second threshold value L2 may be set to be smaller as the start-up time temperature at which the current limitation pattern 60 is selected becomes lower. In this case, among the plurality of current limitation patterns 60, the difference between the second threshold values L2 is smaller than the difference between the first threshold values L1.

Figure 3:
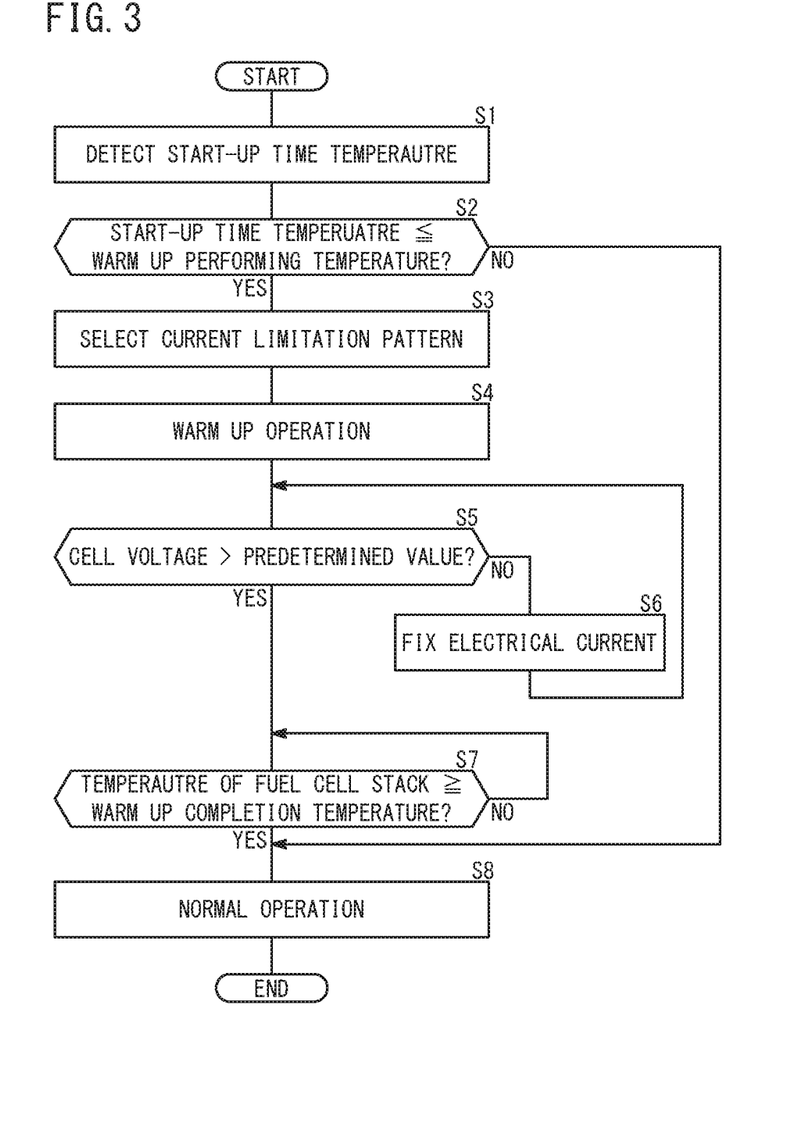
FIG. 3 is a flow chart showing a control method at the time of starting operation of the fuel cell system in FIG. 1.

Next, a method of controlling the fuel cell system 10 according to the embodiment of the present invention will be described with reference to a flow chart shown in FIG. 3.

Firstly, in step S1, operation of the fuel cell stack 16 is started, and monitoring of the temperature of the fuel cell stack 16 by the temperature sensor 52 is started to perform a start-up time temperature detection step of detecting the start-up time temperature.

Next, in step S2, it is determined whether or not the start-up time temperature detected in the start-up time temperature detection step is not more than a warm up performing temperature (e.g., 0° C.). In step S2, if it is determined that the start-up time temperature is higher than the warm up performing temperature (step S2: NO), warm up operation is not performed, and the control proceeds to step S8 to start normal operation of the fuel cell stack 16.

In step S2, if it is determined that the start-up time temperature is not more than the warm up performing temperature (step S2: YES), the routine proceeds to the step S3 and the subsequent steps to perform warm up operation of the fuel cell stack 16.

In step S3, a selection step is performed. In the selection step, a current limitation pattern 60 corresponding to the start-up time temperature detected in the start-up time temperature detection step is selected from the plurality of current limitation patterns 60. The selection step includes selecting the current limitation pattern 60 in which the threshold value from the start-up time temperature to the reference temperature T2 (the first threshold value L1 and the variable threshold value L3) is set to be smaller as the start-up time temperature detected in the start-up time temperature detection step becomes lower. That is, in the selected current limitation pattern 60, the threshold value is set in accordance with the amount of heat radiated from the end power generation cells 14a at the detected start-up time temperature and the increase rate of the variable threshold value L3 becomes larger as the start-up time temperature becomes lower.

Next, in step S4, a power generation step is performed. The power generation step includes performing warm up operation of the fuel cell stack 16 by generating power while limiting electrical current collected from the fuel cell stack 16 based on the current limitation pattern 60 selected in the selection step and the temperature during operation of the fuel cell stack 16 detected by the temperature sensor 52.

Specifically, power generation is performed while limiting output electrical current of the fuel cell stack 16 supplied into the control unit 12 in a manner that the output electrical current does not exceed the threshold value corresponding to the temperature during operation of the fuel cell stack 16 detected by the temperature sensor 52. Power generation may be performed while limiting output electrical current of the fuel cell stack 16 calculated from the power generation voltage of each of the power generation cells 14 supplied into the control unit 12, in a manner that the output electrical current does not exceed the threshold value corresponding to the temperature during operation of the fuel cell stack 16 detected by the temperature sensor 52.

By performing the power generation step, the fuel gas and the oxygen-containing gas are consumed in the electrochemical reactions (power generation reactions) at the anode and the cathode to increase the temperature of the fuel cell stack 16.

In the power generation step, the electrical current collected from the fuel cell stack 16 is limited based on the first threshold value L1 until the detected temperature of the fuel cell stack 16 reaches the non-freezing temperature T1. Further, the electrical current collected from the fuel cell stack 16 is limited based on the variable threshold value L3, during a period in which the detected temperature of the fuel cell stack 16 changes from the non-freezing temperature T1 until the detected temperature of the fuel cell stack 16 reaches the reference temperature T2. Further, after the detected temperature of the fuel cell stack 16 reaches the reference temperature T2, electrical current collected from the fuel cell stack 16 is limited based on the second threshold value L2.

Next, in step S5, it is determined whether or not the minimum power generation voltage of the power generation cells 14 or the average power generation voltage of the power generation cells 14 (hereinafter these voltages will also be referred to as the "cell voltage" collectively) has a value greater than a predetermined value. That is, in step S5, it is determined whether or not the cell voltage has been decreased during warm up operation. In step S5, if it is determined that the cell voltage has a value not more than the predetermined value (step S5: NO), the routine proceeds to step S6 to fix the electrical current collected from the fuel cell stack 16 at a predetermined level. It should be noted that the predetermined value for determining whether or not the decrease in the cell voltage has occurred, and the fixed level of the electrical current may be determined based on a predetermined current limitation threshold value map or a predetermined cell voltage restoration map (both not shown).

Further, during the period in which the electrical current collected from the fuel cell stack 16 is fixed, it is possible to avoid decrease in the output of the drive motor 56 and stabilize the traveling performance of the vehicle by increasing the electrical current supplied from the battery 54 to the drive motor 56. After the process of step S6 is performed, the routine proceeds to step S5 again, and the timing when the cell voltage has a value greater than the predetermined value is awaited.

In step S5, if it is determined that the cell voltage has a value greater than the predetermined value (step S5: YES), the routine proceeds to step S7 to determine whether or not the temperature of the fuel cell stack 16 detected by the temperature sensor 52 is not less than the warm up completion temperature. It should be noted that the warm up completion temperature may be set to be the reference temperature T2 or a predetermined temperature greater than the reference temperature T2. In step S7, if it is determined that the temperature of the fuel cell stack 16 is lower than the warm up completion temperature (step S7: NO), the process of step S7 is performed repeatedly, and the timing when the temperature of the fuel cell stack 16 becomes not less than the warm up completion temperature is awaited.

In step S7, if it is determined that the temperature of the fuel cell stack 16 is not less than the warm up completion temperature (step S7: YES), the routine proceeds to step S8 to start normal operation of the fuel cell stack 16. After the process of this step S8, the flow chart according the embodiment of the present invention is finished.

As described above, in the fuel cell system 10 and the method of controlling the fuel cell system 10 according to the embodiment of the present invention, the current limitation pattern 60, in which as the start-up start temperature becomes lower, i.e., as the amount of heat radiated from the end power generation cells 14a becomes larger, the threshold value of the period in which the temperature of the fuel cell stack 16 increases from the start-up time temperature until the temperature of the fuel cell stack 16 reaches the reference temperature T2 is small, is selected. By limiting the electrical current collected from the fuel cell stack 16 based on the current limitation pattern 60 selected in this manner, at the time of heating the fuel cell stack 16 from the start-up time temperature to the reference temperature T2 by inducing power generation reactions, it is possible to suppress decrease in the power generation voltage below the lower limit voltage also in the end power generation cells 14a which tend to have low temperature in comparison with the other power generation cells 14.

As a result, even if operation of the fuel cell stack 16 is started under the low temperature environment, it is possible to suitably maintain the power generation stability, and suppress decrease in the durability of the fuel cell stack 16.

In the fuel cell system 10, in the current limitation pattern 60, until the temperature of the fuel cell stack 16 reaches the non-freezing temperature T1 at which the end power generation cells 14a provided at the ends of the fuel cell stack 16 in the stacking direction are considered to be not frozen, the threshold value is set to the constant first threshold value L1; after the temperature of the fuel cell stack 16 reaches the reference temperature T2 which is higher than the non-freezing temperature T1, the threshold value is set to the second threshold value L2 which is higher than the first threshold value L1; and during the period in which the temperature of the fuel cell stack 16 changes from the non-freezing temperature T1 until the temperature of the fuel cell stack 16 reaches the reference temperature T2, the threshold value is set to the variable threshold value L3 which increases at the predetermined rate from the first threshold value L1 to the second threshold value L2.

Further, in the method of controlling the fuel cell system 10, the threshold value of the current limitation pattern 60 includes the first threshold value L1, the second threshold value L2 which is higher than the first threshold value L1, and the variable threshold value L3 which increases at the predetermined rate from the first threshold value L1 to the second threshold value L2. The power generation step includes: limiting the electrical current collected from the fuel cell stack 16 based on the first threshold value L1, until the detected temperature of the fuel cell stack 16 reaches the non-freezing temperature T1 at which the end power generation cells 14a provided at the ends of the fuel cell stack 16 in the stacking direction are considered to be not frozen; limiting the electrical current collected from the fuel cell stack 16 based on the variable threshold value L3 during the period in which the detected temperature of the fuel cell stack 16 changes from the non-freezing temperature T1 until the temperature of the fuel cell stack 16 reaches the reference temperature T2 which is higher the non-freezing temperature T1; and limiting the electrical current collected from the fuel cell stack 16 based on the second threshold value L2 after the detected temperature of the fuel cell stack 16 reaches the reference temperature T2.

Immediately after the oxygen-containing gas is humidified, the oxygen-containing gas is supplied, in particular, to the end power generation cells 14a provided at the end closer to the oxygen-containing gas supply port 32, condensed water of liquid produced, e.g., by condensation of water in the oxygen-containing gas may be splashed into the end power generation cell 14a, and the end power generation cell 14a may be frozen easily in comparison with the other cells under the low temperature environment. If the power generation cell 14 is frozen, and the voltage becomes less than the lower limit voltage in the state where normal power generation cannot be performed, deterioration of the electrolyte membrane, etc. occurs more easily.

In this regard, in the fuel cell system 10 and the method of controlling the fuel cell system 10 according to the embodiment of the present invention, until the temperature of the fuel cell stack 16 reaches the non-freezing temperature T1 at which the end power generation cells 14a are considered to be not frozen, the threshold value is not increased, and set to the constant first threshold value L1. In this manner, in the state where the power generation cells 14 is frozen, it is possible to reliably avoid decrease in the voltage below the lower limit voltage, and effectively suppress degradation of the quality of the power generation cells 14.

Further, after the temperature of the fuel cell stack 16 reaches the reference temperature T2 and the fuel cell stack 16 is operated at a temperature closer to the optimum operating temperature range, the electrical current collected from the fuel cell stack 16 is limited based on the second threshold value L2 which is higher than the first threshold value L1. In this manner, since it is possible to improve the power generation efficiency of the fuel cell stack 16, for example, it becomes possible to facilitate increase in the voltage of the fuel cell stack 16 by power generation reaction.

Further, during the period in which the temperature of the fuel cell stack 16 changes from the non-freezing temperature T1 until the temperature of the fuel cell stack 16 reaches the reference temperature T2, the threshold value is set to the variable threshold value L3 which increases at the predetermined rate in accordance with the amount of heat radiated from the end power generation cells 14a. In this manner, it is possible to effectively suppress decrease in the power generation voltage of the power generation cell 14 below the lower limit voltage, and improve the power generation efficiency.

Therefore, by configuring the threshold value of the current limitation pattern 60 based on the first threshold value L1, the second threshold value L2, and the variable threshold value L3, it is possible to effectively suppress decrease in the durability of the fuel cell stack 16, reduce the time required for warm up operation, and efficiently obtain the output of the fuel cell stack 16.

The fuel cell system 10 includes the memory 62 configured to store the plurality of current limitation patterns 60, and the current limiting unit 64 selects one of the plurality of current limitation patterns 60 stored in the memory 62, in accordance with the start-up time temperature.

In the fuel cell system 10, the plurality of current limitation patterns 60 are the plurality of current limitation threshold value maps 60M.

In the fuel cell system 10, the increase rate of the variable threshold value L3 becomes larger as the start-up time temperature at which the current limitation pattern 60 is selected from the plurality of current limitation patterns 60 becomes lower.

In the fuel cell system 10, the non-freezing temperature T1 and the reference temperature T2 are common to the plurality of current limitation patterns 60.

In the fuel cell system 10, in the current limitation pattern 60, the threshold value is defined in accordance with the amount of heat radiated from the end power generation cells 14a at the start-up time temperature.

In the method of controlling the fuel cell system, the selection step includes selecting the single current limitation pattern 60 corresponding to the start-up time temperature, from the plurality of current limitation patterns 60 stored in the memory 62.

In the method of controlling the fuel cell system 10, the selection step includes selecting the current limitation pattern 60 in which the increase rate of the variable threshold value L3 becomes larger as the start-up time temperature becomes lower.

In the method of controlling the fuel cell system 10, the selection step includes selecting the current limitation pattern 60 having the threshold value that is set in accordance with the amount of heat radiated from the end power generation cells 14a at the detected start-up time temperature.

As a result of these processes, in accordance with the amount of heat radiated from the end power generation cells 14a which varies depending on the start-up time temperature, it is possible to effectively suppress decrease of the power generation voltage of the end power generation cells 14a below the lower limit voltage. As a result, even if operation of the fuel cell stack 16 is started under the low temperature environment, it is possible to suitably maintain the power generation stability, and suppress decrease of the durability of the fuel cell stack 16.

The present invention is not limited to the above described embodiment specially. Various modifications may be made without departing from the gist of the present invention.

What is claimed is:

1. A fuel cell system comprising a fuel cell stack formed by stacking a plurality of power generation cells, the fuel cell system comprising:
   a start-up time temperature detection unit configured to detect, as a start-up time temperature, a temperature of the fuel cell stack or an outside temperature at a time of starting operation;
   a stack temperature detection unit configured to detect the temperature of the fuel cell stack; and
   a current limiting unit configured to limit electric current collected from the fuel cell stack,
   wherein the current limiting unit selects, based on the start-up time temperature, one of a plurality of current limitation patterns each defining, for each of the start-up time temperatures, a relationship between a temperature during operation of the fuel cell stack and a threshold value of maximum electrical current collected from the fuel cell stack, and limits the electrical current collected from the fuel cell stack according to the selected current limitation pattern,
   the threshold value for a period in which the temperature of the fuel cell stack increases from the start up time temperature until the temperature of the fuel cell stack reaches a predetermined reference temperature is set to be smaller as the start-up time temperature at which the current limitation pattern is selected from the plurality of current limitation patterns becomes lower, and
   in the current limitation pattern, during a period in which the temperature of the fuel cell stack changes from a non-freezing temperature at which an end power generation cell provided at an end of the fuel cell stack in a stacking direction is considered to be not frozen until the temperature of the fuel cell stack which is higher than the non-freezing temperature reaches a reference temperature, the threshold value is set to a variable threshold value which increases at a predetermined rate.

2. The fuel cell system according to claim 1, further comprising a memory configured to store the plurality of current limitation patterns,
wherein the current limiting unit selects one of the plurality of current limitation patterns stored in the memory, in accordance with the start-up time temperature.

3. The fuel cell system according to claim 1, wherein the plurality of current limitation patterns are a plurality of current limitation threshold value maps.

4. The fuel cell system according to claim 1, wherein in the current limitation pattern,
until the temperature of the fuel cell stack reaches the non-freezing temperature, the threshold value is set to a constant first threshold value, and
after the temperature of the fuel cell stack reaches the reference temperature, the threshold value is set to a second threshold value which is higher than the first threshold value
during the period in which the temperature of the fuel cell stack changes from the non-freezing temperature until the temperature of the fuel cell stack reaches the reference temperature, the threshold value is set to the variable threshold value.

5. The fuel cell system according to claim 1, wherein an increase rate of the variable threshold value becomes larger as the start-up time temperature at which the current limitation pattern is selected from the plurality of current limitation patterns becomes lower.

6. The fuel cell system according to claim 1, wherein the non-freezing temperature and the reference temperature are common to the plurality of current limitation patterns.

7. The fuel cell system according to claim 1, wherein, in the current limitation pattern, the threshold value is defined in accordance with an amount of heat radiated from the end power generation cell at the start-up time temperature.

8. A method of controlling a fuel cell system including a fuel cell stack formed by stacking a plurality of power generation cells, the method comprising:
a start-up time temperature detection step of detecting, as a start-up time temperature, a temperature of the fuel cell stack or an outside temperature at a time of starting operation;
a selection step of selecting a current limitation pattern corresponding to the start-up time temperature detected in the start-up time temperature detection step, from a plurality of current limitation patterns each defining, for each of the start-up time temperatures, a relationship between a temperature during operation of the fuel cell stack and a threshold value of maximum electrical current collected from the fuel cell stack; and
a power generation step of performing power generation while limiting electrical current collected from the fuel cell stack based on the selected current limitation pattern and the temperature during operation of the fuel cell stack detected by a stack temperature detection unit,
wherein the selection step includes selecting the current limitation pattern in which the threshold value for a period in which the temperature of the fuel cell stack increases from the start-up time temperature until the temperature of the fuel cell stack reaches a predetermined reference temperature is set to be smaller as the start-up time temperature detected in the start-up time temperature detection step becomes lower, and
the power generation step includes limiting the electrical current collected from the fuel cell stack based on a variable threshold value which increases at a predetermined rate during a period in which the detected temperature of the fuel cell stack changes from a non-freezing temperature at which an end power generation cell provided at an end of the fuel cell stack in a stacking direction is considered to be not frozen until the detected temperature of the fuel cell stack reaches a reference temperature which is higher the non-freezing temperature.

9. The method of controlling the fuel cell system according to claim 8, wherein the selection step includes selecting the single current limitation pattern corresponding to the start-up time temperature, from the plurality of current limitation patterns stored in the memory.

10. The method of controlling the fuel cell system according to claim 8, wherein the threshold value of the current limitation pattern comprises a first threshold value, a second threshold value which is higher than the first threshold value, and the variable threshold value, and
the power generation step includes:
limiting the electrical current collected from the fuel cell stack based on the first threshold value, until the detected temperature of the fuel cell stack reaches the non-freezing temperature;
limiting the electrical current collected from the fuel cell stack based on the variable threshold value during the period in which the detected temperature of the fuel cell stack changes from the non-freezing temperature until the detected temperature of the fuel cell stack reaches the reference temperature; and
limiting the electrical current collected from the fuel cell stack based on the second threshold value after the detected temperature of the fuel cell stack reaches the reference temperature.

11. The method of controlling the fuel cell system according to claim 8, wherein the selection step includes selecting the current limitation pattern in which an increase rate of the variable threshold value becomes larger as the start-up time temperature becomes lower.

12. The method of controlling the fuel cell system according to claim 8, wherein the selection step includes selecting the current limitation pattern having the threshold value that is set in accordance with an amount of heat radiated from the end power generation cell at the detected start-up time temperature.

* * * * *